Oct. 12, 1926.
A. W. TEEL
1,602,868
VEHICLE WINDOW
Filed Jan. 11, 1926
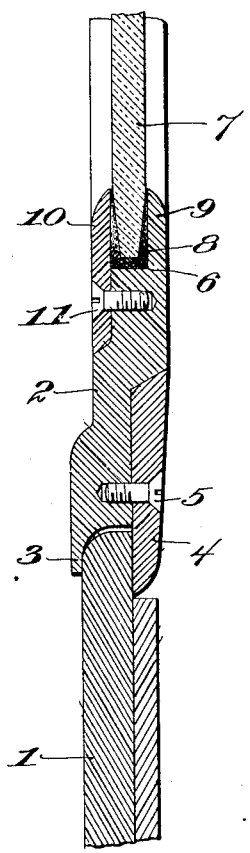
Witness
Jas. J. Maloney.
Inventor
Alden Warren Teel
by his attorneys
Van Everen Fish Hildreth & Cary Patented Oct. 12, 1926.

1,602,868

UNITED STATES PATENT OFFICE.

ALDEN WARREN TEEL, OF MEDFORD, MASSACHUSETTS, ASSIGNOR TO E. TEEL & COMPANY, A COPARTNERSHIP CONSISTING OF ALDEN WARREN TEEL AND ELBRIDGE TEEL, BOTH OF MEDFORD, MASSACHUSETTS.

VEHICLE WINDOW.

Application filed January 11, 1926. Serial No. 80,408.

The present invention relates to an improvement in vehicle windows.

In the construction of carriage and automobile bodies, the practice has been to set the glass of the windows in frames, fastening it in place by means of a retaining strip or by putty or the like, but in the course of use the vibrations to which the body is subjected loosen the retaining strip or disintegrate the putty or other material, or loosen the felt which embraces the edge of the glass, and rain water striking the surface of the glass flows down and rusts the securing means for the strips, increases the disintegration of the putty or other material, or enters the felt and gradually rusts the channel in which the felt is supported, or allows the water to flow into the interior of the body, which is thereby constantly subjected to the destructive influence of the rain; in some cases the water flows through into the inside of the body, further injuring the body and upholstery.

The object of the present invention is to produce a window construction for use in automobile bodies of such form as to discharge any water entering between the glass and its fastening means on the exterior of the body. To this end the invention consists in the improvement in windows for automobile bodies hereinafter described and particularly defined in the claim.

The accompanying drawing illustrates a vertical section of the lower portion of a window frame for a vehicle body.

The illustrated embodiment of the invention is described as follows: The body 1 of the vehicle has a window opening which receives the window frame 2. This frame is of metal, preferably aluminum because of its lightness, provided with an overhanging lip 3, which extends down outside of the outer surface of the body, as shown. This window frame is secured in place by means of a frame clamp 4, secured in place by screws 5, by means of which the window frame is securely clamped in position in the window opening of the body. It will be understood that the window frame extends continuously around the window opening of the body. The window frame is provided with a glass recess 6, which receives the edge of the window glass 7. After the window frame is secured in place in the body, the window glass provided with the usual felt covering 8, is inserted in the glass recess 6, resting against the inside glass lip 9. Then the glass clamp 10, which is of the shape of the frame, is placed in position, and the screws 11 are screwed into the window frame to secure the glass clamp in place.

It will be observed that any rain which runs down the glass, if it follows down inside of the glass clamp, may find its way out at the lower end of the glass clamp and be discharged upon the outside of the car body. Also, the window frame overhanging the body, as shown, contributes to throw off any water which may run down the surface of the window frame.

Ordinarily in putting the window in place in the body the glass will be put in place in the window frame and then the glazed window will be applied to the body as described. In case of breakage of the glass in use, the entire window frame need not be removed, but by simply removing the glass clamp a new glass may be inserted and the clamp replaced without opening the joints between the window frame and the body.

Having thus described the invention, what is claimed is:—

A vehicle window comprising a window frame consisting of a member adapted to be secured in place in the vehicle body, and extending completely around and housing the window opening, such frame being provided with a glass recess having a glass lip forming one side of the recess extending over and adapted to engage the marginal portion of the inside of the glass, a glass clamp secured on the outside of the window frame and adapted to engage the outer marginal portion of the glass, and means for securing it to the window frame whereby any rain water running down the glass and finding its way into the packing between the glass and the frame will drain out underneath the glass clamp.

In testimony whereof I have signed my name to this specification.

ALDEN WARREN TEEL.